Patented Aug. 7, 1951

2,563,697

UNITED STATES PATENT OFFICE 2,563,697

CHOLADIENES

Albert Wettstein and Charles Meystre, Basel, Switzerland, assignors to Ciba Pharmaceutical Products, Inc., Summit, N. J.

No Drawing. Application December 8, 1947, Serial No. 790,441. In Switzerland December 13, 1946

14 Claims. (Cl. 260—397.4)

The present invention relates to new and useful $\Delta^{20,23}$-21-R-choladienes, wherein R stands for a free, an esterified or an etherified hydroxyl group, and to the preparation of the said compounds.

$\Delta^{20,23}$-21-halogen-choladienes and the preparation thereof from $\Delta^{20,23}$-choladienes with the aid of an N-halogenated carboxylic acid-imide, -amide or -arylamide have been described in copending application, Ser. No. 741,954, filed April 16, 1947. These $\Delta^{20,23}$-21-halogen-choladienes constitute the starting materials for the present invention, the process of which, briefly stated, involves treating the said starting materials with an agent capable of replacing aliphatically bound halogen by free or esterified or etherified hydroxyl.

The starting materials may be of any desired configuration, they contain conjugated carbon-to-carbon double bonds in the side-chain and, for the rest, may be saturated or may be unsaturated for example in the 4 or 5 or 7 or 11 or 14 and/or 16 positions. In addition to the halogen atom in 21-position, they may contain any desired additional substituents, particularly hydroxy, acyloxy, alkoxy, aryloxy and/or keto-groups for example in 3 or 7 or 11 and/or 12-position, halogen atoms e. g. in 4 or 5 or 6-position, as well as aryl or alkyl groups for example in 24-position.

According to the invention, the starting materials may be converted by means of hydrolyzing agents, e. g. aqueous solvents, especially mixtures of water with indifferent organic solvents such as dilute acetone or dilute dioxane, into 21-hydroxy compounds; by means of suitable re-esterifying agents, for example carboxylic acid salts or sulfonic acid salts, such as acetic, propionic or benzoic acid salts or methane sulfonic acid salts or toluene sulfonic acid salts, into esterified 21-hydroxy compounds; or by means of etherifying agents, for example alcohols or phenols, such as methanol, ethanol, benzyl alcohol, tetra-acylglucose or hepta-acyllactose, or with corresponding alcoholates or phenolates, into etherified 21-hydroxy compounds.

These reactions generally proceed smoothly at room temperature or with the application of heat, owing to high reactivity of the 21-halogen atom. In the reaction with aqueous solvents or alcohols or phenols, the resultant hydrogen halide may be removed by the addition of acid binding agents, for example solutions or suspensions of metal carbonates or hydroxides, such as alkaline earth, alkali or silver carbonates or hydroxides. The treatment with the re-esterifying agents takes place in suspension or in solution of organic, aqueous-organic, or inert solvents or diluents, use being made for example of the corresponding carboxylic acids and, in some cases of their anhydrides. Similarly the alcoholates or phenolates may be allowed to react in solution, particularly of the corresponding alcohol, or in suspension, for instance in an inert solvent.

The products of the process may be isolated and purified as usual, for example, by recrystallization, etc. They find therapeutic utility as such or may serve as intermediates for the preparation of pharmaceuticals.

The invention is described in greater detail in the following examples, wherein the same relationship exists between parts by weight and parts by volume as exists between grams and cubic centimeters.

Example 1

10 parts by weight of $\Delta^{20,23}$-3,12-diacetoxy-21-bromo-24,24-diphenyl-choladiene, obtainable for example according to the aforementioned application Ser. No. 741,954 and 10 parts by weight of anhydrous potassium acetate are heated in the water-bath for 2 hours in 100 parts by volume of pure glacial acetic acid with exclusion of moisture, complete solution being realized from the beginning. The solution is then evaporated in vacuo, water is added to the residue and extraction carried out with ether. The ethereal solution is washed with water, dried and evaporated. The so-obtained crude $\Delta^{20,23}$-3,12,21-triacetoxy-24,24-diphenyl-choladiene is recrystallized for example from a mixture of acetone and methanol. The pure substance melts at 175–177° C.

The conversion of the $\Delta^{20,23}$-3,12-diacetoxy-21-bromo-24,24-diphenyl-choladiene to the $\Delta^{20,23}$-3,12,21-triacetoxy-24,24-diphenyl-choladiene may also take place as follows: 10 parts by weight of $\Delta^{20,23}$-3,12-diacetoxy-21-bromo - 24,24 - diphenyl-choladiene are heated on the water-bath for several hours in a mixture of 500 parts by volume of acetone (or dioxane) and 100 parts by volume of water (with or without addition of potassium acetate or calcium carbonate). The solution, which contains the $\Delta^{20,23}$-3,12-diacetoxy-21-hydroxy-24,24-diphenyl-choladiene is concentrated by evaporation in vacuo, the aqueous suspension extracted with ether, the ethereal solution washed with water, dried, and evaporated. By recrystallization from methanol, the residue yields the pure 21-hydroxy-diene of double melting point 123–125° C. and 167–169° C. It is then kept, together with 5 parts by volume of pyridine and 10 parts by volume of acetic anhydride, for 15 hours in the cold or for one hour on the boiling water-bath, and the solution evaporated in vacuo. The residue is taken up in ether and the ethereal solution washed with dilute hydrochloric acid and water, dried and evaporated. There is thus obtained the crude $\Delta^{20,23}$-3,12,21-triacetoxy-24,24-diphenyl-choladiene, which may be treated as afore-stated.

Example 2

4 parts by weight of $\Delta^{20,23}$-3-keto-12-acetoxy-21-bromo-24,24-diphenyl-choladiene, obtainable according to the aforementioned copending application, are dissolved in 40 parts by volume of glacial acetic acid and 10 parts by volume of acetic anhydride and heated on the boiling water-bath for 2 hours with 4 parts by weight of anhydrous potassium acetate. 4 parts of $\Delta^{20,23}$-3-keto-12-acetoxy-21-bromo-24,24-diphenyl-choladiene may also be dissolved in 20 parts by volume of benzene and 20 parts by volume of glacial acetic acid. The whole may be mixed with a solution of 20 parts of anhydrous potassium acetate in 20 parts by volume of glacial acetic acid, and the solution allowed to stand for 20 hours at room temperature. The solution is then evaporated in vacuo, water added to the residue and the aqueous suspension extracted with an ether-chloroform mixture (4:1). The ether-chloroform solution is washed with water, dried and evaporated. The residue contains $\Delta^{20,23}$-3-keto-12,21-diacetoxy-24,24-diphenyl-choladiene. This may be recrystallized from isopropyl ether or a mixture of ether and pentane, and melts at 186–188° C.

Instead of $\Delta^{20,23}$-3-keto-12-acetoxy-21-bromo-24,24-diphenyl-choladiene, it is also possible to use other esters, e. g. the 12-benzoate or the 12-anthraquinone-carboxylic acid ester, as starting material, and thus to obtain the corresponding 12,21-diester.

Example 3

In order to obtain the starting material for this example, 10 parts by weight of $\Delta^{20,23}$-3-keto-12-p-toluenesulfoxy-24,24-diphenyl-choladiene (which can be prepared for instance from $\Delta^{20,23}$-3-keto-12-acetoxy-24,24-diphenyl-choladiene by alkaline hydrolysis followed by standing for 6 days with an excess of p-toluenesulfonic acid chloride in pyridine) are converted according to the aforesaid patent application with bromosuccinimide into $\Delta^{20,23}$-3-keto-12-p-toluenesulfoxy-21-bromo-24,24-diphenyl-choladiene. This crude bromide is now heated on the water-bath for 8 hours with 200 parts by volume of acetone and 20 parts by volume of water. The acetone is then evaporated in vacuo, the obtained aqueous suspension is extracted with ether, the ethereal solution washed with water, dried and evaporated. The reaction product, $\Delta^{20,23}$-3-keto-12-p-toluenesulfoxy-21-hydroxy-24,24-diphenyl-choladiene, is then allowed to stand for 15 hours, for acetylation, in 10 parts by volume of pyridine and 20 parts by volume of acetic anhydride. The solution is then concentrated in vacuo, extracted with an ether-chloroform mixture (4:1), the ether-chloroform solution washed with hydrochloric acid and water, dried and evaporated.

For splitting off the tosyl radical, the $\Delta^{20,23}$-3-keto-12-p-toluenesulfoxy-21-acetoxy-24,24-diphenyl-choladiene is heated to 140° C. in an evacuated autoclave with pyridine for 15 hours. After evaporating the reaction solution, the residue is taken up in ether-chloroform solution, this solution washed with dilute hydrochloric acid and water, dried and evaporated. The so-obtained $\Delta^{11,20,23}$-3-keto-21-acetoxy-24,24-diphenyl-cholatriene may be purified by recrystallization.

By starting, instead of from $\Delta^{20,23}$-3-keto-12-p-toluenesulfoxy-24,24-diphenyl-choladiene, from the corresponding 12-anthraquinone-carboxylic acid ester, the splitting off of this radical may be carried out thermally with formation of the 11,12-double bond.

Example 4

2 parts by weight of $\Delta^{20,23}$-3,12-diacetoxy-21-bromo-24,24-diphenyl-choladiene are heated to boiling on the water-bath with 40 parts by volume of ethanol for 2 hours. The reaction solution is neutralized with an alcoholic solution of sodium ethylate and the residue of the vacuum-concentrated solution is heated, for re-acetylation, for 1 hour on the boiling water-bath with 1 part by volume of pyridine and 2 parts by volume of acetic anhydride. Thereupon the solution is evaporated in vacuo with addition of water, and the residue is taken up in ether. The ethereal solution is washed with dilute hydrochloric acid and water, dried and evaporated. Upon recrystallizing the residue from acetone, there is obtained $\Delta^{20,23}$-3,12-diacetoxy-21-ethoxy-24,24-diphenyl-choladiene of melting point 177–179° C.

The conversion of the 21-bromo-diene into the ethyl ether may also be carried out in presence of sodium alcoholate or calcium carbonate or in presence of indifferent solvents, such as benzene.

Example 5

A solution of 10 parts by weight of $\Delta^{20,23}$-3-acetoxy-5-chloro-21-bromo-24,24-diphenyl-choladiene [which may be prepared according to the aforesaid copending application] in 50 parts by volume of dry benzene and 50 parts by volume of pure methanol is heated to boiling on the water-bath for 2 hours and, after addition of 1 part by volume of concentrated hydrochloric acid, is further boiled for 1 more hour. Thereupon it is evaporated in vacuo. The residue consists of $\Delta^{20,23}$-3-hydroxy-5-chloro-21-methoxy-24,24-diphenyl-choladiene.

Example 6

A methanol-benzene solution of $\Delta^{20,23}$-3-hydroxy-5-chloro-21-methoxy-24,24-diphenyl-choladiene, obtained as in Example 5, is treated with 4 parts by weight of potassium hydroxide and further heated for 1 hour on the water-bath. The solution, concentrated in vacuo, is shaken out with ether, the ethereal solution washed with water, dried and evaporated. The residue, $\Delta^{5,20,23}$-3-hydroxy-21-methoxy-24,24-diphenyl-cholatriene, is dissolved without being purified in 50 parts by volume of cyclohexanone and 400 parts by volume of toluene. For drying, 100 parts by volume of toluene are distilled off. Into the solution, which continues to distil slowly, there is dropped within a period of 30 minutes a solution of 2.5 parts by weight of aluminum isopropylate in 50 parts by volume of pure toluene. Then the reaction mixture is cooled, admixed with 50 parts by volume of a concentrated Seignette salt solution, and steam distilled for 1 hour. Hereupon the aqueous suspension is shaken out with ether. The ethereal solution is washed with water, dried and evaporated and yields $\Delta^{4,20,23}$-3-keto-21-methoxy-24,24-diphenyl-cholatriene.

By reacting $\Delta^{20,23}$-3-acetoxy-5-chloro-21-bromo-24,24-diphenyl-choladiene with ethyl alcohol or benzyl alcohol, instead of methyl alcohol, there are obtained the corresponding 21-derivatives.

Example 7

The $\Delta^{4,20,23}$-3-keto-21-bromo-24,24-diphenyl-cholatriene, obtained for example by reaction of 10 parts by weight of $\Delta^{4,20,23}$-3-keto-24,24-diphenyl-cholatriene with bromosuccinimide, is heated on the water-bath for 3 hours with 10 parts by weight of dry potassium acetate in 100 parts by volume of pure glacial acetic acid. The solution is concentrated in vacuo, the residue treated with water, and the obtained suspension shaken out with ether. The ethereal solution is washed with water, dried and evaporated. The residue is the $\Delta^{4,20,23}$-3-keto-21-acetoxy-24,24-diphenyl-cholatriene.

If, instead of with potassium acetate in glacial acetic acid, the $\Delta^{4,20,23}$-3-keto-21-bromo-24,24-diphenyl-cholatriene is reacted with the propionate, butyrate or valerate in propionic, butyric or valeric acid, respectively, the corresponding 21-derivatives result.

Example 8

To prepare the starting material of this example, 10 parts by weight of $\Delta^{11,20,23}$-3-keto-24,24-diphenyl-cholatriene (which may be prepared e. g. from $\Delta^{20,23}$-3-keto-12-p-toluenesulfoxy-24,24-diphenyl-choladiene [see Example 3] by heating with pyridine at 140° C. for 15 hours in an evacuated autoclave) are converted into $\Delta^{11,20,23}$-3-keto-21-bromo-24,24-diphenyl-cholatriene by means of bromo-succinimide according to the disclosure of the aforesaid application. This bromide is then, as in Example 2, reacted with potassium acetate in glacial acetic acid to produce the $\Delta^{11,20,23}$-3-keto-21-acetoxy-24,24-diphenyl-cholatriene.

Example 9

The starting material may be prepared as follows: 3-hydroxy-11-keto-cholanic acid-methyl ester (Helv. 26, 536 [1943]) is reacted with phenylmagnesium-bromide, water split off from the resultant 3,24-dihydroxy-11-keto-24,24-diphenyl-cholane, then acetylated and the $\Delta^{23}$-3-acetoxy-11-keto-24,24-diphenyl-cholene converted into $\Delta^{20,23}$-3-acetoxy-11-keto-24,24-diphenyl-choladiene by reaction with bromosuccinimide, followed by splitting off of hydrogen bromide. By alkaline saponification followed by dehydrogenation with cyclohexanone in presence of aluminum isopropylate, there is obtained $\Delta^{20,23}$-3,11-diketo-24,24-diphenyl-choladiene, of which 10 parts by weight are converted into $\Delta^{20,23}$-3,11-diketo-21-bromo-24,24-diphenyl-choladiene by means of bromo-succinimide according to the process of Ser. No. 741,954.

The bromide recrystallized from ether and acetone, melting at 210° C. with decomposition, is reacted with potassium acetate in glacial acetic acid analogously as described in Example 2, and worked up in the manner set out in said example. The resulting crude $\Delta^{20,23}$-3,11-diketo-21-acetoxy-24,24-diphenyl-choladiene crystallizes from ether or isopropylether and melts unsharply at about 180–210° C. For the purpose of purification it is hydrolyzed with aqueous potassium carbonate preferably by boiling for one hour in a mixture of methanol and benzene 2:1. The solution is then concentrated in a vacuum with addition of water. The resulting aqueous suspension is shaken out with ether, the ethereal solution washed with water, dried and evaporated. The residue is chromatographed over aluminum oxide, and the column is elutriated with a mixture of hexane and benzene 1:1 and then with benzene. The benzene elutriates contain $\Delta^{20,23}$-3,11-diketo-21-hydroxy-24,24-diphenyl-choladiene and are evaporated. The residue is mixed with a mixture of acetic-anhydride and pyridine 2:1. The solution is allowed to stand at room temperature for 20 hours, then concentrated in a vacuum with addition of water. The oily residue is dissolved in ether, the ethereal solution washed with dilute hydrochloric acid and water, dried and evaporated. The $\Delta^{20,23}$-3,11-diketo-21-acetoxy-24,24-diphenyl-choladiene crystallizes in the form of short prisms. These are recrystallized from a little acetone and ether and then melt at 215–217° C.

Example 10

To prepare the starting material, $\Delta^{23}$-3-hydroxy-11-keto-24,24-diphenyl-cholene (see Example 9) is dehydrogenated with cyclohexanone in presence of aluminum isopropylate to the $\Delta^{23}$-3,11-diketo-24,24-diphenyl-cholene, the latter brominated with 2 mols of bromine and converted into $\Delta^{4,23}$-3,11-diketo-24,24-diphenyl-choladiene by treating with dimethyl-aniline. This diene is brominated with 1 mol of bromosuccinimide while exposing to light, and the resultant 22-bromide thermally converted into $\Delta^{4,20,23}$-3,11-diketo-24,24-diphenyl-cholatriene. 5 parts by weight of this triene are reacted with 1.76 parts by weight of bromosuccinimide according to the aforesaid patent application to form the $\Delta^{4,20,23}$-3,11-diketo-21-bromo-24,24-diphenyl-cholatriene.

The crude bromide is converted, analogously to the process described in Example 2, with potassium acetate in glacial acetic acid, into $\Delta^{4,20,23}$-3,11-diketo-21-acetoxy-24,24-diphenyl-cholatriene.

Example 11

14 parts by weight of $\Delta^{20,23}$-3-keto-12-acetoxy-21-bromo-24,24-diphenyl-choladiene are converted, according to Example 3, into $\Delta^{20,23}$-3-keto-12,21-diacetoxy-24,24-diphenyl-choladiene. The suspension of this substance in 100 parts by volume of methanol and 15 parts by volume of water is boiled, together with 5.5 parts by weight of potassium carbonate, for one hour. To the clear solution there is then added some water, the reaction mixture is evaporated under reduced pressure and the residue taken up in ether. The ethereal solution is washed with water, dried and concentrated, whereby the $\Delta^{20,23}$-3-keto-12,21-dihydroxy-24,24-diphenyl-choladiene crystallizes. It is recrystallized from acetone, and afterwards melts at 145° C., solidifies to form needles when further heated, and melts definitely at 215–217° C.

10 parts by weight of $\Delta^{20,23}$-3-keto-12,21-dihydroxy-24,24-diphenyl-choladiene are heated for 2 hours at 55° C. with 20 parts by weight of succinic anhydride in 100 parts by volume of pyridine. The clear solution is cooled, diluted with water and concentrated by evaporation in vacuo. The resulting suspension is extracted with an ether-chloroform mixture in the ratio of 4:1. The ether chloroform solution is then briefly washed with dilute hydrochloric acid and water, dried and concentrated. The $\Delta^{20,23}$ - 3 - keto - 12 - hydroxy - 21 - succinyloxy-24,24-diphenyl-choladiene soon crystallizes and is recrystallized from a small quantity of chloroform and ether or from acetone. It melts at 214-215° C. 10 parts by weight of $\Delta^{20,23}$-3-keto-12 - hydroxy - 21 - succinyloxy - 24,24 - diphenyl-choladiene are suspended in a mixture of benzene and ethyl acetate and mixed with an excess of ethereal solution of diazo-methane. After 30 minutes the solution is clear. It is carefully washed with dilute hydrochloric acid, dilute sodium carbonate solution and water, dried and evaporated. The residue is dissolved in a small quantity of acetone and the solution mixed with methanol, the methyl ester of the $\Delta^{20,23}$-3-keto-12 - hydroxy - 21 - succinyloxy - 24,24 - diphenyl-choladiene precipitating in the form of crystals. This methyl ester first melts at 175° C. Needles are then formed in the melt which later at 184-185° C. also melt.

5 parts by weight of the methyl ester of the $\Delta^{20,23}$ - 3 - keto - 12 - hydroxy - 21 - succinyloxy-24,24 - diphenyl - choladiene and 7 parts by weight of para-toluene-sulfonic acid chloride are dissolved in 25 parts by volume of pyridine. The solution is heated at 38-40° for 6 days. It is then carefully diluted with water and extracted with ether. The ethereal solution is washed with dilute hydrochloric acid, a dilute solution of sodium carbonate in water, dried and evaporated. The residue consists of the methyl ester of the $\Delta^{20,23}$-3 - keto - 12 - para - toluene - sulfoxy - 21 - succinyloxy-24,24-diphenyl-choladiene.

The products of the invention provide a ready means for the production of 21-substituted pregnane derivatives. This may be accomplished for instance by subjecting the said compounds to oxidative degradation of the diene side chain by means for chromic acid or the like. Thus, for example, the $\Delta^{20,23}$ - 3 - hydroxy - 5 - chloro - 21 - methoxy - 24,24 - diphenyl - choladiene of Example 5 may be oxidatively degraded by means of chromium trioxide to the 5 - chloro - 21 - dimethoxy-pregnane-3,20-dione. This may be converted, by splitting off hydrogen chloride, to the desoxycorticosterone-methyl ether ($\Delta^4$-21-methoxy - pregnene - 3,20 - dione). Similarly, the $\Delta^{4,20,23}$ - 3 - keto - 21 - acetoxy - 24,24 - diphenyl-cholatriene of Example 7 may be converted into desoxycorticosterone acetate ($\Delta^4$ - 21 - acetoxy-pregene-3,20-dione), or the $\Delta^{4,20,23}$-3,11-diketo-21 - acetoxy - 24,24 - diphenyl - cholatriene of Example 10 into 11 - dehydro - corticosterone acetate ($\Delta^4$ - 21 - acetoxy - pregnene - 3,11,20-trione).

Having thus described the invention, what is claimed is:

1. $\Delta^{20,23}$-choladienes which contain in the 21-position a member selected from the group consisting of hydroxy, lower alkoxy and hydroxy esterified with a lower unsubstituted aliphatic carboxylic acid.

2. $\Delta^{20,23}$-24,24-diaryl-choladienes which contain in the 21-position a member selected from the group consisting of hydroxy, lower alkoxy and hydroxy esterified with a lower unsubstituted aliphatic carboxylic acid.

3. $\Delta^{20,23}$-24,24-diphenyl-choladienes which contain in the 21-position a member selected from the group consisting of hydroxy, lower alkoxy and hydroxy esterified with a lower unsubstituted aliphatic carboxylic acid and in the 3-position a member selected from the group consisting of a free, etherified and esterified hydroxyl group and a keto group.

4. $\Delta^{20,23}$-24,24-diphenyl-choladienes which contain in the 21-position a member selected from the group consisting of hydroxy, lower alkoxy and hydroxy esterified with a lower unsubstituted aliphatic carboxylic acid and in the 3-position and in one of the positions 11 and 12 a member selected from the group consisting of a free, etherified and esterified hydroxyl group and a keto group.

5. $\Delta^{20,23}$-3,11-diketo - 21 - acyloxy - 24,24 - diphenyl-choladienes, wherein the acyl radical is that of a lower unsubstituted aliphatic carboxylic acid.

6. $\Delta^{20,23}$-3,11-diketo - 21 - acetoxy - 24,24 - diphenyl-choladiene.

7. $\Delta^{4,20,23}$-3-11-diketo - 21 - acyloxy - 24,24 - diphenyl-cholatrienes, wherein the acyl radical is that of a lower unsubstiuted aliphatic carboxylic acid.

8. $\Delta^{4,20,23}$-3,11-diketo - 21 - acetoxy - 24,24 - diphenyl-cholatriene.

9. $\Delta^{20,23}$ - 12,21 - diacyloxy - 24,24 - diphenyl-choladienes, wherein the acyl radical is that of a lower unsubstituted aliphatic carboxylic acid.

10. $\Delta^{20,23}$-3-keto - 12,21 - diacetoxy - 24,24 - diphenyl-choladiene.

11. $\Delta^{20,23}$-3,12,21-triacyloxy - 24,24 - diphenyl-choladienes, wherein the acyl radical is that of a lower unsubstituted aliphatic carboxylic acid.

12. $\Delta^{20,23}$-3,12,21-triacetoxy - 24,24 - diphenyl-choladiene.

13. $\Delta^{4,20,23}$-keto-21-acyloxy - 24,24 - diphenyl-cholatrienes, wherein the acyl radical is that of a lower unsubstituted aliphatic carboxylic acid.

14. $\Delta^{4,20,23}$-3-keto-21-acetoxy-24,24 - diphenyl-cholatriene.

ALBERT WETTSTEIN.
CHARLES MEYSTRE.

No references cited.